United States Patent
Kowalkowski et al.

(10) Patent No.: US 9,080,494 B2
(45) Date of Patent: Jul. 14, 2015

(54) PARTICULATE FILTER MONITORING METHODS AND SYSTEMS

(75) Inventors: Janean E Kowalkowski, Northville, MI (US); Cheryl J Stark, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 700 days.

(21) Appl. No.: 13/154,890

(22) Filed: Jun. 7, 2011

(65) Prior Publication Data

US 2012/0311994 A1   Dec. 13, 2012

(51) Int. Cl.
  *F01N 3/00* (2006.01)
  *F01N 11/00* (2006.01)

(52) U.S. Cl.
  CPC ............. *F01N 11/00* (2013.01); *F01N 2550/04* (2013.01); *F01N 2900/0422* (2013.01); *F01N 2900/08* (2013.01); *F01N 2900/102* (2013.01); *F01N 2900/1606* (2013.01); *Y02T 10/47* (2013.01)

(58) Field of Classification Search
  CPC ........... F01N 11/00; F01N 3/18; F01N 3/021; F01N 9/002; F01N 9/005; F01N 9/007; F01N 2560/14; F01N 2250/04; F01N 2900/1606; F01N 2900/102; F01N 2900/16; F02D 19/088; F02D 41/0245
  USPC .............................. 60/274, 285, 295, 311, 273
  See application file for complete search history.

(56) References Cited

U.S. PATENT DOCUMENTS

| | | | | |
|---|---|---|---|---|
| 2005/0223701 A1* | 10/2005 | Sato et al. | | 60/295 |
| 2005/0268597 A1* | 12/2005 | Kosaka | | 60/277 |
| 2007/0256408 A1* | 11/2007 | Kogo et al. | | 60/286 |
| 2008/0163609 A1* | 7/2008 | Satou et al. | | 60/287 |
| 2010/0011750 A1* | 1/2010 | Onodera et al. | | 60/287 |
| 2010/0058743 A1* | 3/2010 | Tsukada et al. | | 60/287 |
| 2011/0131951 A1* | 6/2011 | Arrigoni et al. | | 60/274 |
| 2011/0314792 A1* | 12/2011 | Shibata et al. | | 60/273 |
| 2013/0074458 A1* | 3/2013 | Haseyama et al. | | 55/282.3 |
| 2013/0213236 A1* | 8/2013 | Takaoka et al. | | 96/413 |

FOREIGN PATENT DOCUMENTS

| | | | | |
|---|---|---|---|---|
| EP | 1617059 A1 * | 1/2006 | | F02D 41/02 |
| FR | 2950653 A1 * | 4/2011 | | |
| JP | 2004218558 A * | 8/2004 | | F01N 3/02 |
| JP | 2005054631 A * | 3/2005 | | F01N 3/02 |
| JP | 2005299438 A * | 10/2005 | | F01N 3/02 |
| JP | 2006316746 A * | 11/2006 | | |
| JP | 2008121631 A * | 5/2008 | | |
| JP | 2010156241 A * | 7/2010 | | |

OTHER PUBLICATIONS

Machine Translation of JP 2005-054631, Machine Translated on Jan. 21, 2014.*

* cited by examiner

*Primary Examiner* — Thomas Denion
*Assistant Examiner* — Patrick Maines
(74) *Attorney, Agent, or Firm* — Cantor Colburn LLP

(57) ABSTRACT

A method of monitoring regeneration of a particulate filter is provided. The method includes evaluating whether a regeneration event is based on a fixed threshold condition; selectively setting a pass or fail status based on the evaluating; and generating a message indicating the pass or fail status.

16 Claims, 3 Drawing Sheets

PARTICULATE FILTER MONITORING METHODS AND SYSTEMS

FIELD

Exemplary embodiments of the invention relate to methods, systems, and computer program products for monitoring regeneration of a particulate filter in a vehicle.

BACKGROUND

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Particulate filters ("PF") remove the particulate matter from the exhaust gas. The particulate matter accumulates within the PF. The accumulated particulate matter causes an increase in exhaust system backpressure experienced by the engine. To address this increase, the PF is periodically cleaned, or regenerated. Regeneration of a PF in vehicle applications is typically automatic and is controlled by an engine or other controller based on signals generated by engine and/or exhaust system sensors.

Accordingly, it is desirable to provide systems and methods for monitoring the frequency of regenerating a PF.

SUMMARY

In one exemplary embodiment, a method of monitoring regeneration of a particulate filter is provided. The method includes evaluating whether a regeneration event is based on a fixed threshold condition; selectively setting a pass or fail status based on the evaluating; and generating a message indicating the pass or fail status.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
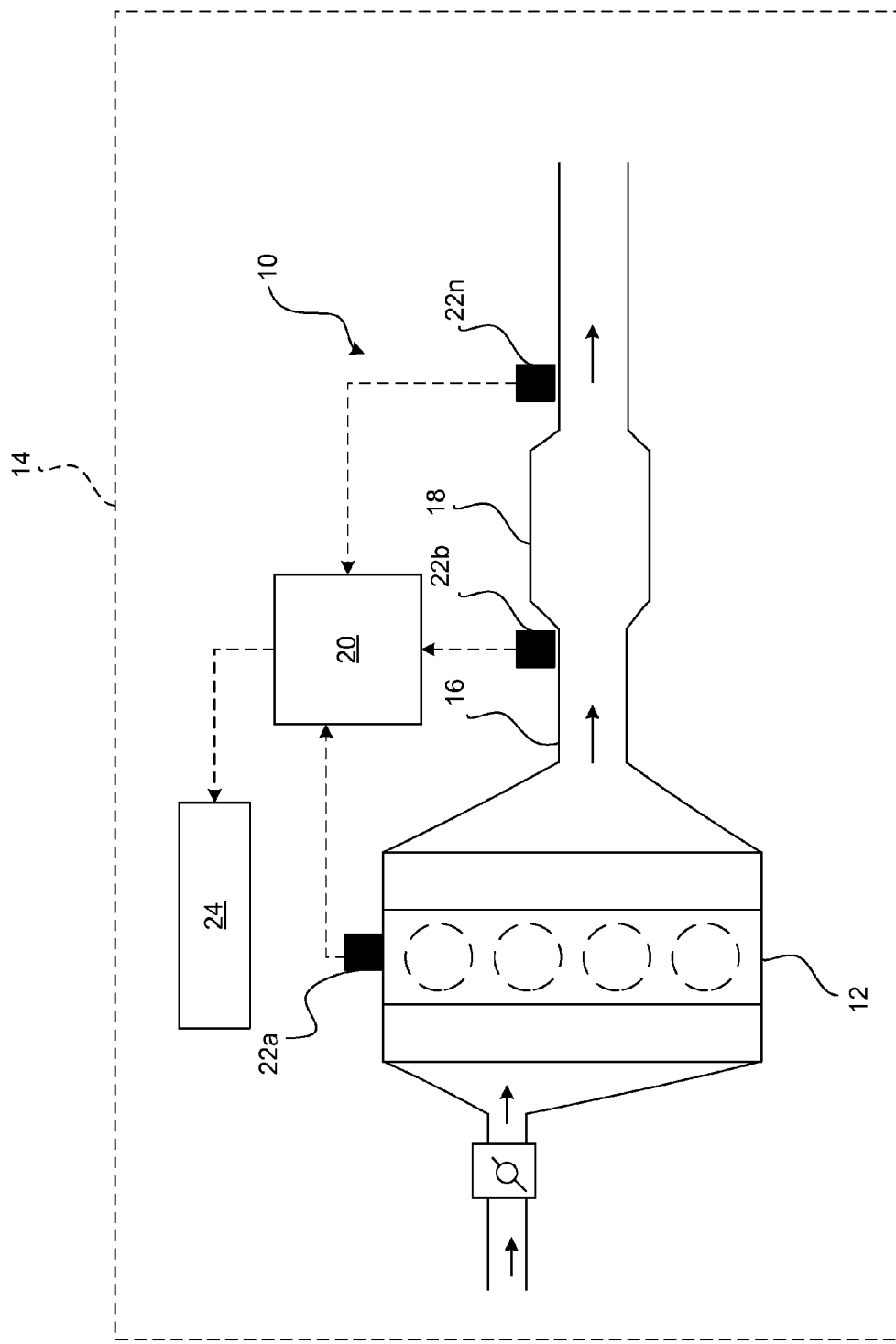
FIG. 1 is a functional block diagram of a vehicle including an exhaust system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, exemplary embodiments are directed to an exhaust gas treatment system 10, for the reduction of regulated exhaust gas constituents of an internal combustion engine, such as an engine 12, of a vehicle 14. As can be appreciated, the engine 12 can be of any engine type including, but not limited to, a diesel engine, a gasoline direct injection engine, a homogeneous charge compression ignition engine, or other engine type.

The exhaust gas treatment system 10 generally includes one or more exhaust gas conduits 16, and one or more exhaust treatment devices. In various embodiments, the exhaust treatment devices include, at least a particulate filter device (PF) 18. As can be appreciated, other exhaust gas treatment devices (not shown) may be disposed upstream and/or downstream of the PF 18. Such exhaust treatment devices can include, but are not limited to, an oxidation catalyst device, a selective catalytic reduction device, or other treatment device.

In FIG. 1, the exhaust gas conduit 16, which may comprise several segments, transports exhaust gas from the engine 12 to the various exhaust treatment devices of the exhaust gas treatment system 10. The PF 18 receives the exhaust gas and operates to filter the exhaust gas of carbon and other particulates. In various embodiments, the PF 18 may be constructed using a ceramic wall flow monolith filter. The filter may be packaged in a shell or canister that has an inlet and an outlet in fluid communication with the exhaust gas conduit 16. The ceramic wall flow monolith may have a plurality of longitudinally extending passages that are defined by longitudinally extending walls. The passages include a subset of inlet passages that have and open inlet end and a closed outlet end, and a subset of outlet passages that have a closed inlet end and an open outlet end.

Exhaust gas entering the filter through the inlet ends of the inlet passages is forced to migrate through adjacent longitudinally extending walls to the outlet passages. It is through this wall flow mechanism that the exhaust gas is filtered of carbon and other particulates. The filtered particulates are deposited on the longitudinally extending walls of the inlet passages and, over time, will have the effect of increasing the exhaust gas backpressure experienced by the engine 12. It is appreciated that the ceramic wall flow monolith filter is merely exemplary in nature and that the PF 18 may include other filter devices such as, for example, wound or packed fiber filters, open cell foams, or sintered metal fibers.

The accumulation of particulate matter within the PF 18 is periodically cleaned, or regenerated. Regeneration involves the oxidation or burning of the accumulated carbon and other particulates in what is typically a high temperature (e.g., greater than 600° C.) environment. The regeneration may be performed by controlling the engine 12 and/or one or more exhaust components such that the temperature of the exhaust gas is increased. The increase in temperature of the exhaust gas passing through the PF 18 provides the high temperature environment that is needed for the regeneration.

A control module 20 controls the engine 12 and/or one or more exhaust components based on sensed and/or or modeled data. The sensed data can be received from one or more sensors 22a-22n of the engine 12 and/or the exhaust treatment system 10.

In various embodiments, the control module 20 monitors a frequency of regeneration to determine if the frequency is greater than a frequency threshold. When monitoring the frequency of regeneration, the control module 20 evaluates whether the regeneration was triggered by a fixed threshold condition, such as, for example, a time threshold, a distance threshold, a fuel counter threshold, or other fixed threshold condition. When the regeneration is triggered by a fixed threshold condition, by definition, the regeneration cannot be too frequent. In various embodiments, the control module 20 sets a diagnostic code 24 based on whether the regeneration was triggered by a fixed threshold condition. For example, the control module 20 can set the diagnostic code 24 to indicate test pass when the regeneration was triggered based on the fixed threshold condition. The control module 20 can report the diagnostic code 24 according to various reporting methods, including, but not limited to, using in-vehicle communication reporting messages and/or off-vehicle reporting messages.

Figure 2:
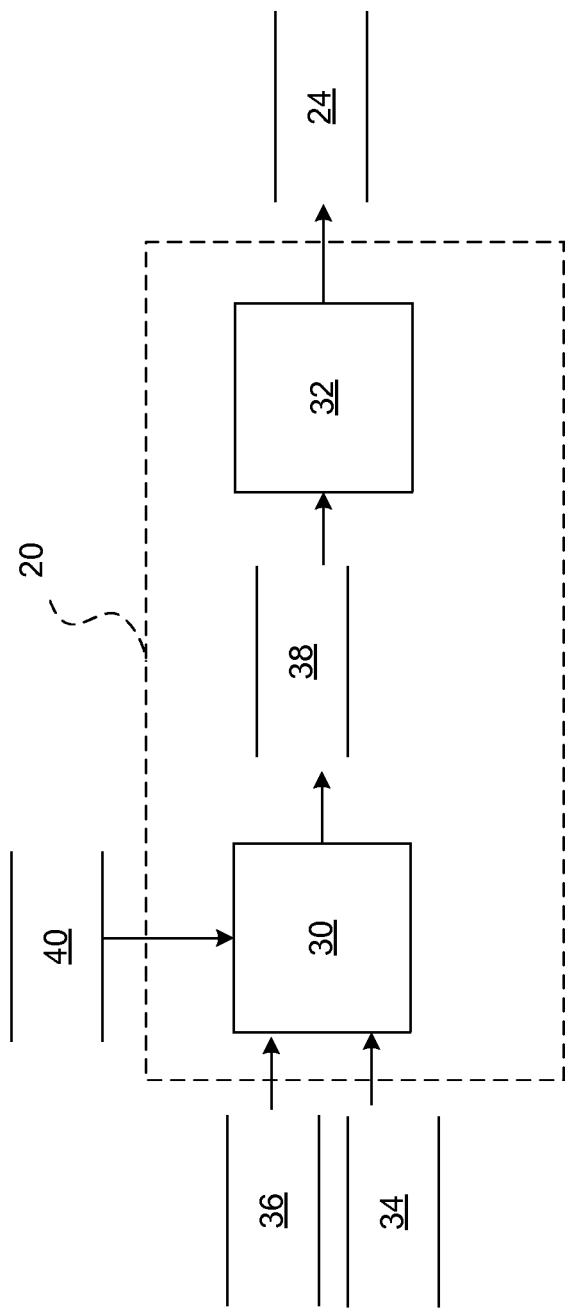
FIG. 2 is a dataflow diagram illustrating a regeneration monitoring system of the exhaust system in accordance with exemplary embodiments.

Referring now to FIG. 2, a dataflow diagram illustrates various embodiments of a regeneration monitoring system that may be embedded within the control module 20. Various embodiments of regeneration monitoring systems according to the present disclosure may include any number of sub-modules embedded within the control module 20. As can be appreciated, the sub-modules shown in FIG. 2 may be combined and/or further partitioned to similarly monitor regeneration of the PF 18 (FIG. 1). Inputs to the system may be sensed from the engine 12 (FIG. 1) via sensors 22a-22n (FIG. 1), received from other control modules (not shown), and/or determined/modeled by other sub-modules (not shown) within the control module 20. In various embodiments, the control module 20 includes a condition evaluation module 30, and a reporting module 32.

The condition evaluation module 30 receives as input a regeneration status 34 and a trigger type 36. In various embodiments, the regeneration status 34 indicates whether regeneration is occurring, has occurred, or is not occurring. In various embodiments, the trigger type 36 indicates what type of condition triggered the regeneration that is occurring or that has occurred. The type of condition may include, for example, a fixed threshold condition, such as, a time condition (e.g., triggering regeneration when regeneration has not occurred for X time), a distance condition (e.g., triggering regeneration when regeneration has not occurred for X miles), a fuel counter condition (e.g., triggering regeneration when regeneration has not occurred for X amount of burned fuel), or other fixed threshold based condition, and a measured/modeled based condition (e.g., triggering regeneration based on a measured or modeled amount of soot in the particulate filter).

The condition evaluation module 30 sets a pass/fail status 38 based on the trigger type 36, and the regeneration status 34. For example, if the regeneration status 34 indicates that regeneration is occurring or has occurred, and the trigger type 36 indicates a fixed threshold condition based trigger, the condition evaluation module 30 sets the pass/fail status 38 to PASS. Thus, automatically passing the diagnostic to prevent any false failures.

In another example, if the regeneration status 34 indicates that regeneration is occurring or has occurred, and the trigger type 36 indicates a measured/modeled based condition, the condition evaluation module 30 evaluates soot mass 40 at various locations in the system 10 to determine if the diagnostic should be passed or failed. For example, the condition evaluation module 30 can compare an engine out predicted soot mass to a delta pressure sensor predicted soot mass to determine if the diagnostic should be passed or failed. The condition evaluation module 30 sets the pass/fail status 38 based on whether the diagnostic should be passed or failed.

The reporting module 32 receives as input the pass/fail status 38. Based on the pass/fail status 38, the reporting module 32 sets the value of the diagnostic code 24 associated with the particulate filter and reports the diagnostic code 24. In various embodiments, the diagnostic code 24 can be reported by generating a message on a serial data bus (not shown) of the vehicle 14 (FIG. 1), where the message can be transmitted to a remote location using a telematics system (not shown) of the vehicle 14 (FIG. 1) or can be retrieved by a technician tool (not shown) connected to the vehicle 14 (FIG. 1).

Figure 3:
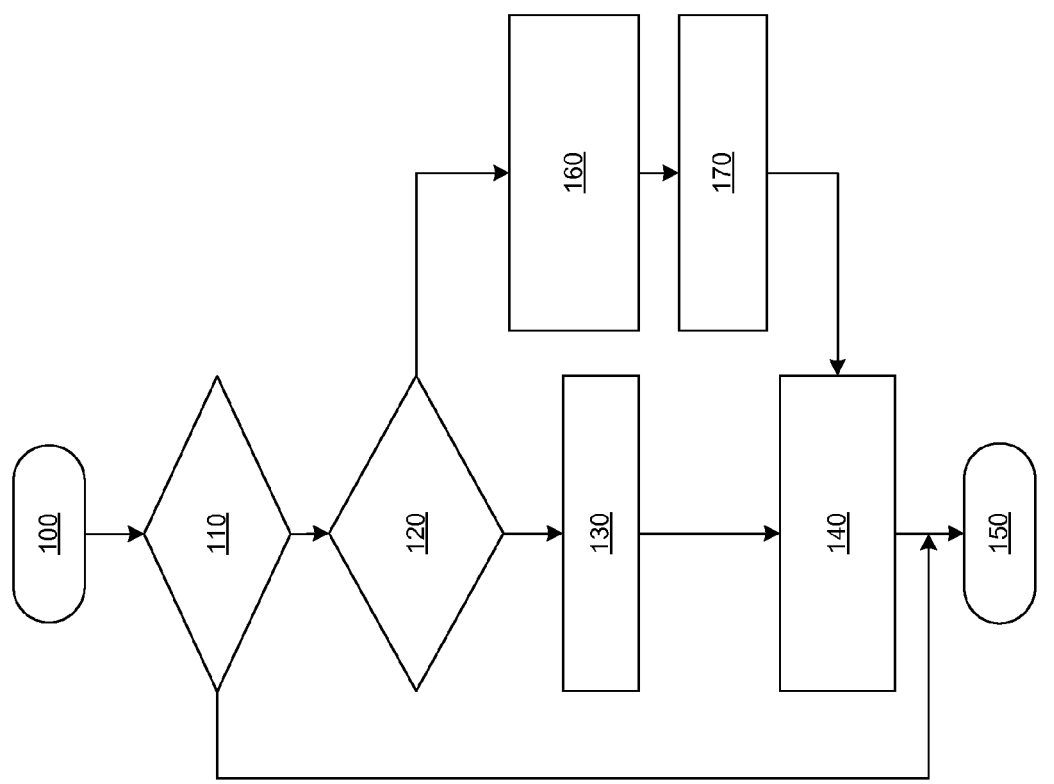
FIG. 3 is a flowchart illustrating a regeneration monitoring method that may be performed by the exhaust system in accordance with exemplary embodiments.

Referring now to FIG. 3, and with continued reference to FIGS. 1 and 2, a flowchart illustrates a regeneration monitoring method that can be performed by the control module 20 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at 100. The regeneration status is evaluated at 110 and the trigger type is evaluated at 120. If the regeneration status indicates that regeneration is occurring or has occurred at 110 and the trigger type indicates that the regeneration was triggered based on a fixed threshold based condition at 120, the pass/fail status is set to PASS at 130. Thereafter, the trouble code is set to indicate based on the pass/fail status and reported, for example, as discussed above at 140. The method may end at 150.

If however, the regeneration status indicates that regeneration is occurring or has occurred at 110 and the trigger type indicates that the regeneration was triggered based on a measured or modeled based condition at 120, the predicted soot mass at various locations in the engine system is evaluated to determine if the diagnostic should be passed or failed at 160 and the pass/fail status is set based on the evaluation at 170. Thereafter, the trouble code is set to indicate based on the pass/fail status and reported, for example, as discussed above at 140. The method may end at 150.

If, however, the regeneration status indicates that regeneration has not occurred at 110, the method may end at 150.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:
1. A method of monitoring regeneration of a particulate filter of a vehicle, comprising:
   regenerating the particulate filter;
   determining whether a regeneration event of the particulate filter is triggered by a fixed threshold condition;

if the regeneration event is triggered by the fixed threshold condition, automatically passing a diagnostic to prevent any false failures;

if the regeneration event is not triggered by the fixed threshold condition, determining whether the diagnostic should be passed or failed by evaluating soot mass; and generating a message for transmitting to a telematics system or for being retrieved by a technician tool connected to the vehicle, the message indicating whether the diagnostic has passed or failed.

2. The method of claim 1 wherein the fixed threshold condition is a time threshold.

3. The method of claim 1 wherein the fixed threshold condition is a distance threshold.

4. The method of claim 1 wherein the fixed threshold condition is a fuel counter condition.

5. The method of claim 1 wherein the regeneration event is not triggered by the fixed threshold condition when the regeneration event is based on a measured or modeled based condition.

6. The method of claim 1 wherein the message comprises a diagnostic code that indicates whether the diagnostic has failed or passed.

7. A system in a vehicle, comprising:
a particulate filter;
a condition evaluation module comprising a processor coupled to a memory, the condition evaluation module configured to:
determine whether a regeneration event of the particulate filter is triggered by a fixed threshold condition;
automatically pass a diagnostic to prevent any false failures in response to determining that the regeneration event is triggered by the fixed threshold condition; and
determine whether the diagnostic should be passed or failed based on an evaluation of soot mass in response to determining that the regeneration event is not triggered by the fixed threshold condition; and
a reporting module comprising a processor coupled to a memory, the reporting module configured to generate a message for transmitting to a telematics system or for being retrieved by a technician tool connected to the vehicle, the message indicating whether the diagnostic has passed or failed.

8. The system of claim 7 wherein the fixed threshold condition is a time threshold.

9. The system of claim 7 wherein the fixed threshold condition is a distance threshold.

10. The system of claim 7 wherein the fixed threshold condition is a fuel counter condition.

11. The system of claim 7 wherein the regeneration event is not triggered by the fixed threshold condition when the regeneration event is based on a measured or modeled based condition.

12. The system of claim 7 wherein the message comprises a diagnostic code that indicates whether the diagnostic has passed or failed.

13. An exhaust system, comprising:
a particulate filter; and
a control module comprising a processor coupled to a memory, the control module configured to:
determine whether a regeneration event of the particulate filter is triggered by a fixed threshold condition;
automatically pass a diagnostic to prevent any false failures in response to determining that the regeneration event is triggered by the fixed threshold condition; and
determine whether the diagnostic should be passed or failed based on an evaluation of soot mass in response to determining that the regeneration event is not triggered by the fixed threshold condition.

14. The exhaust system of claim 13 wherein the fixed threshold condition is at least one of a time threshold, a distance threshold, and a fuel counter condition.

15. The exhaust system of claim 13 the regeneration event is not triggered by the fixed threshold condition when the regeneration event is based on a measured or modeled based condition.

16. The system of claim 13 wherein the control module is further configured to generate a message including a diagnostic code that indicates whether the diagnostic has passed or failed.

* * * * *